United States Patent [19]

Takei

[11] Patent Number: 4,763,886

[45] Date of Patent: Aug. 16, 1988

[54] XY-POSITIONING TABLE

[75] Inventor: Seiji Takei, Yokohama, Japan

[73] Assignee: Nippon Thompson Co., Ltd., Tokyo, Japan

[21] Appl. No.: 65,875

[22] Filed: Jun. 24, 1987

[30] Foreign Application Priority Data

Dec. 26, 1986 [JP]  Japan ................................. 61-308139

[51] Int. Cl.⁴ .............................................. B23Q 1/04
[52] U.S. Cl. ....................................................... 269/73
[58] Field of Search ..................... 269/71, 73; 74/479; 108/137, 139, 400, 143; 248/184, 416

[56] References Cited

U.S. PATENT DOCUMENTS 4,610,442  9/1986  Oku et al. ............................. 269/73

FOREIGN PATENT DOCUMENTS 25453323  4/1977  Fed. Rep. of Germany ........ 269/72
1024211  6/1983  U.S.S.R. ................................. 269/73

Primary Examiner—Robert C. Watson
Attorney, Agent, or Firm—Rogers & Killeen

[57] ABSTRACT

The XY-positioning table of the present invention includes a base, an X-axis-movable table and a Y-axis-movable table, as well as, X-axis, and Y-axis driving means, attached to said base: where the X-axis-movable table is provided with an X-axis nut to engage with a threaded shaft driven by said X-axis driving means; while in the interior cavity or space of the X-axis-movable table is provided a Y-axis nut capable of engaging with another threaded shaft driven by the Y-axis driving means with auxiliary bearings being provided between the Y-axis nut box and the Y-axis table for effecting X-axis rectilinear-motion, thus realizing a smooth and accurate relative X-Y directional movement between the X-axis and Y-axis movable tables and the bed. Further advantages of the present XY-positioning table are: since the Y-axis driving-mechanism is accomodated almost within the interior space or cavity of the X-axis table, the present XY-positioning table can be made smaller in size, while as the weight of the Y-axis driving-mechanism is not provided on the X-axis-movable table, the inertial force taking place upon the movement of the table can be minimized and, accordingly, the present XY-positioning table can insure highly accurate indexing or positioning of working tools relative to workpieces. Further, the provision of bearing means for effecting rectilinear motion between the X-axis-movable table and the Y-axis-movable table, in association with X-axis and Y-axis driving-mechanisms gives rise to, in the present XY-positioning table, not only a greater load resisting capacity but an accurate and stable indexing or positioning performance for an extended long period of operating time.

7 Claims, 5 Drawing Sheets

XY-POSITIONING TABLE

BACKGROUND OF THE INVENTION

1. Field of the Invention

The present invention relates to an XY-positioning table, more specifically, to an XY-positioning table consisting of a lower table and an upper table relatively movable therewith and for use in accurately positioning the upper table to the lower table thereby to precisely indexing the tools secured on the upper table onto workpieces, in which the inertial force taking place upon the movement of the tables can be reduced thereby to improve accuracy of positioning or indexing of both the tables relative to each other as well as the workpieces.

2. Description of the Prior Art

As a prior art is disclosed by, for example, Japanese Utility Model Application Disclosure No. 44144-1983, an XY-positioning table device consisting of an upper table and a lower table and designed to reduce the inertial force taking place upon the movement of the lower table relative to the device by decreasing the load imposed on to the lower table by means of a simple mechanism. In the above-mentioned device, however, such a simple mechanism as mentioned above is provided outside the table so as to prevent the weight of the driving motor for the upper table from being borne by the lower table, thus not only greatly increasing the whole dimension of the XY-positioning table but also forming not a small barrier in its miniaturization.

Further the above-mentioned prior X-Y positioning device adopts a construction in which the positioning of the upper table relative to the lower table is effected by means of a follower-type bearing means provided on both sides of guide rail means, hence, when the upper table is moved, the accuracy in indexing or positioning of the upper table relative to the lower table is greatly influenced by accuracy of the relevant bearing means, accuracy of guide rail means, and gap between the bearing means and the guide rail means so on, thus giving rise to a problem of accuracy in positioning or indexing of the tables.

SUMMARY OF THE INVENTION

The present invention has been proposed to eliminate the aforesaid defects of the prior art and, as its objects, provides such an XY-positioning table in a far smaller size than before, yet performing a more accurate indexing or positioning operation as compared with the prior XY-positioning table in a stable conditions for a long period and at a lower cost.

In view of the above objects of the present invention, the present XY-positioning table has the following construction:

In an XY-positioning table comprising:
a bed,
an X-axis-movable table mounted slidably on said bed,
a Y-axis-movable table mounted slidably on said X-axis-movable table,
bearing means for effecting rectilinear motion provided both between said bed and said X-axis-movable table and between the X-axis-movable table and the Y-axis-movable table, and
X-axis driving means and Y-axis driving means,
said XY-positioning table is characterized in that said X-axis driving means and said Y-axis driving means each are attached to said bed through support means;
the X-axis-movable table is provided with an X-axis nut engaging, in a relatively movable fashion, with a threaded shaft that in turn is connected to the rotation shaft of said X-axis driving means;
clearance-forming slots are formed in the side walls of said X-axis-movable table, and a Y-axis nut box is provided in the interior cavity or space of said X-axis-movable table, said Y-axis nut box containing a Y-axis nut adapted to engage, in a relatively movable fashion, with a threaded shaft that is in turn connected to the rotation shaft of the Y-axis driving means; and
auxiliary bearing means for effecting X-axis rectilinear motion are provided between said Y-axis nut box and said Y-axis-movable table.

In the present device, said Y-axis nut may be formed integrally with said Y-axis nut box.

The bearing track grooves for the auxiliary bearings for effecting X-axis rectilinear motion may be formed either on a track block to be attached to said Y-axis nut box, or directly on the Y-axis nut box.

ACTION OF THE INVENTION

According to the present invention, by rotating the X-axis driving means, both the X-axis-movable table and the Y-axis-movable table are driven at the same time in the X-axial direction. But the mechanism in itself for driving the Y-axis-movable table including the Y-axis driving means, threaded shaft connected to the rotation shaft of the Y-axis driving means, the Y-axis nut engaging, in a relatively movable fashion, with the threaded shaft, and others does not move in the X-axial direction due to the provision and the inherent action each of the clearance slots and the auxiliary bearings for effecting X-axis rectilinear motion and said mechanism remains to keep a stationary state relative to the bed. Therefore, according to the present invention is made possible to provide a Y-axis driving means for moving said Y-axis-movable table outside said table.

Thus in the present XY-positioning table, the driving means for X-axis and Y-axis-movable tables are attached, through support means, to the bed separate and apart from the table. Due to the above-mentioned construction, the weight of the driving means is not imposed on the tables, thus reducing the inertial force taking place upon the movement of the tables.

Furthermore, the Y-axis nut of the present construction is connected to the Y-axis-movable table through bearing means for effecting rectilinear motion (auxiliary bearing for an X-axis rectilinear motion), therefore the present XY-positioning table can exhibit not only a greater load bearing capacity but a highly improved indexing or positioning accuracy.

DESCRIPTION OF THE PREFERRED EMBODIMENT

Figure 1:
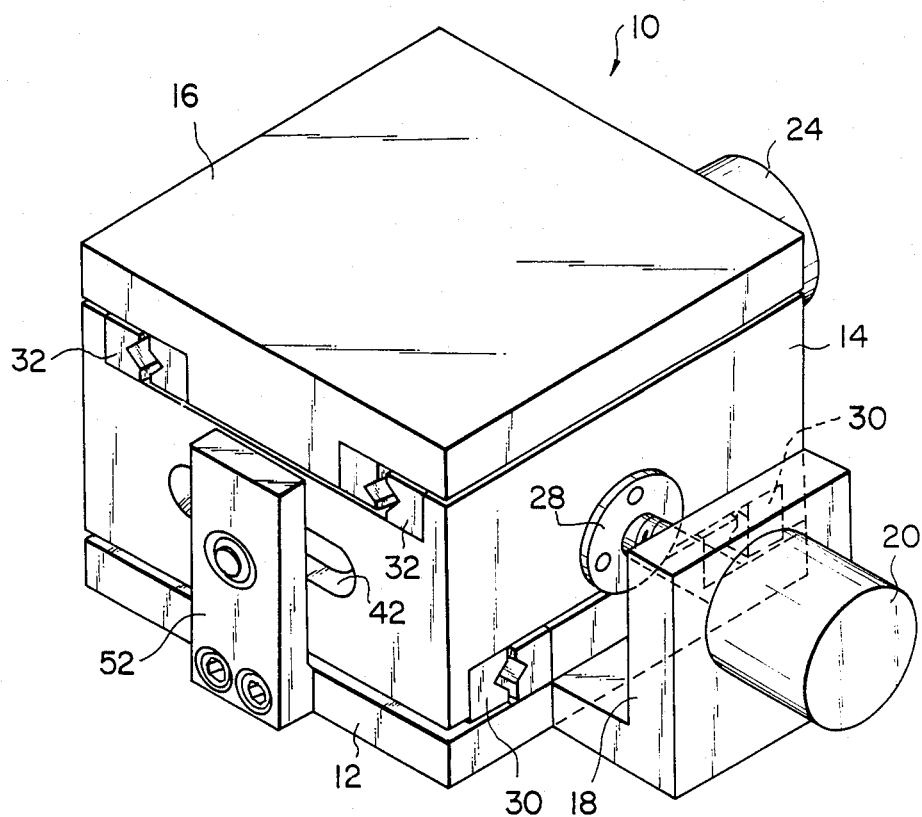
FIG. 1 is a general perspective view illustrating an embodiment of the present invention.
Figure 1:
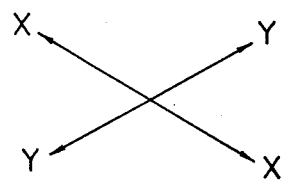

With reference to the attached drawings will be given detailed explanations regarding an embodiment of the present invention. In the drawings, identical symbols are given to identical members.

FIG. 1 is a general perspective view of the XY-positioning table 10 according to the present invention. The basic construction of the XY-positioning table 10 essentially includes a bed 12, an X-axis-movable table 14 movably mounted on the bed 12, and a Y-axis-movable table 16 movably mounted on the X-axis-movable table.

A motor bracket 18 is formed sidewise on the bed 12 and an X-axis-driving servo-motor 20 is attached to said bracket 18. Although not illustrated in FIG. 1, another motor bracket 22 is provided sidewise on the bed 12 (see FIG. 3), and a Y-axis-driving servo-motor 24 is attached to said bracket 22.

The rotation shaft of X-axial-driving servo-motor 20 is connected to one end of an threaded shaft 26 that extends in the X-axis direction and said threaded shaft 26 is engageably and movably inserted in the X-axis nut 28 that is in turn securely attached to the X-axis-movable table 14.

Bearing means 30 for effecting X-axis rectilinear motion is interposed between the bed 12 and the X-axis-movable table 14, so as to allow them for making a relative sliding movement with each other. Moreover, bearing means 32 for effecting Y-axis rectilinear motion is interposed between the X-axis-movable table 14 and the Y-axis-movable table 16, so as to allow them for making a relative sliding movement with each other. In the present embodiment, the bearing means 30 and 32 for effecting rectilinear motions are so arranged as to intersect each other at right angles, to define X-axial direction line (the X-direction arrow line in FIG. 1), and Y-axial direction line (the Y-direction arrow line in FIG. 1), respectively.

Figure 2:
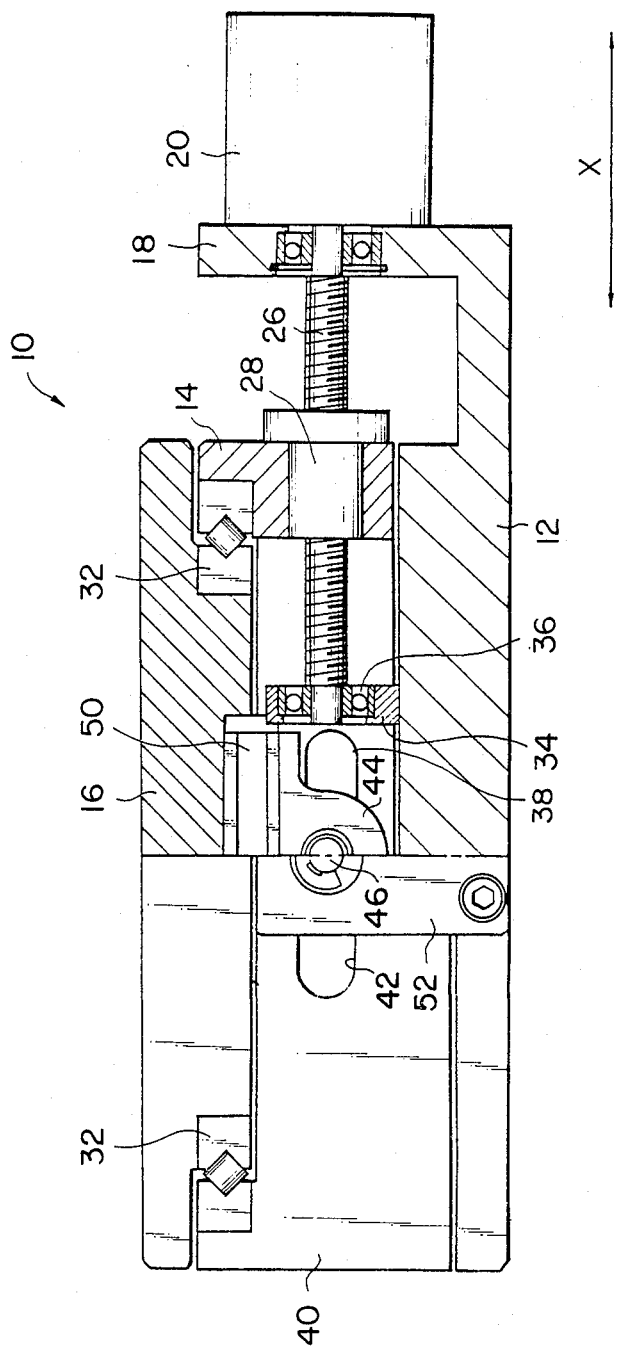
FIG. 2 is a partly sectional side view of the present invention wherein the present XY-positioning table in FIG. 1 is seen from the Y-axial direction.

Now, referring to FIG. 2, the X-axis threaded shaft 26 is connected, at one end, to the rotation shaft of servo-motor 20 for effecting X-axial movement, while said X-axis threaded shaft 26 is supported, at the other end, pivotally on bearing means that is encased in an X-axis support-member 34 securely provided on said bed 12.

The X-axis table 14 has an interior space or cavity 38 surrounded by side walls 40, while clearance slot 42 is formed in each of the opposing side walls 40 of the X-axis table 14.

The Y-axis nut box 44 is accommodated within the interior space or cavity 38 of the X-axis-movable table and said Y-axis nut box 44 includes a Y-axis nut 48 engaging with the hereinafter stated Y-axis threaded, shaft 46. In the upper portion of the Y-axis nut box 44 is provided auxiliary bearing means 50 for effecting X-axis rectilinear motion, thus enabling the Y-axis table 16 to slide in the X-axial direction relative to the nut box 44. The part 52 in FIG. 3 shows the support for Y-axis threaded shaft.

Figure 3:
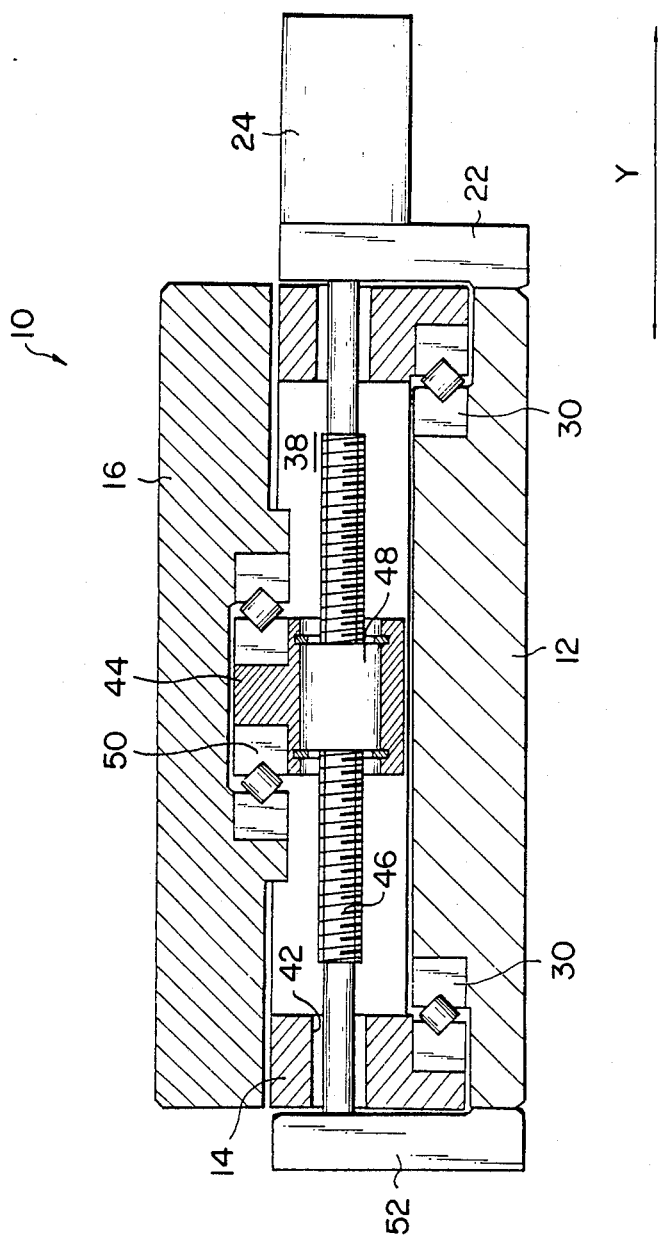
FIG. 3 is a sectional side view of the present XY-positioning table shown in FIG. 1, as seen from the X-axial direction.

FIG. 3 is a front view of the XY-positioning table as viewed from the X-axial direction on FIG. 1. Referring to FIG. 3, a servo-motor 24 for driving the Y-axis-movable table in the Y-axis direction is fixed to the motor support bracket 22, and the rotation shaft of the servo-motor 24 is connected to the Y-axis threaded shaft 46. The Y-axis threaded shaft 46 engageably passes through the Y-axis nut 48 and further through the clearance-forming slots 42 until it is rotatably supported by the support member 52 for Y-axis threaded shaft at one end and at the other opposite end by the support braket for the servo-motor 24. As stated above, the Y-axis nut 48 is provided in the Y-axis nut box 44, while between the Y-axis nut box 44 and the Y-axis-movable table 16 are interposed auxiliary bearing means 50 for effecting X-axial rectilinear-motion of said table relative to said nut box. The auxiliary bearing means 50 allow the Y-axis nut box 44 and Y-axis table 16 to slidably move relative to the X-axial direction but the auxiliary bearing means 50 do not allow them to slidably move relative to the Y-axial direction.

Figure 4:
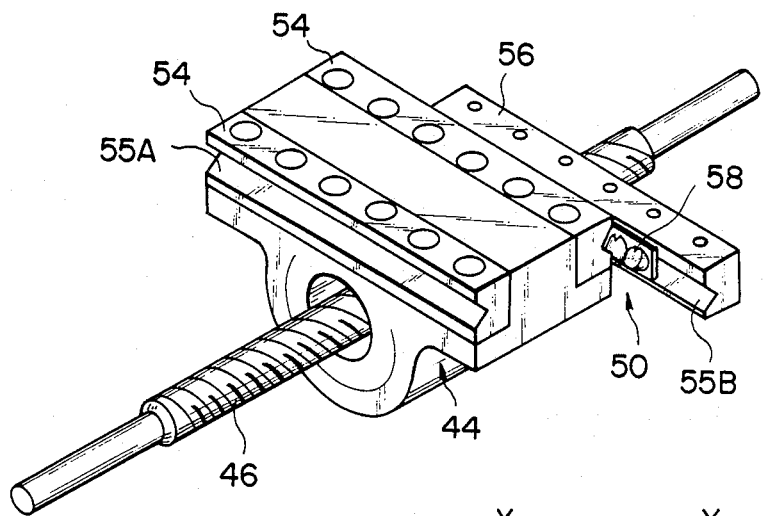
FIG. 4 is a perspective view of an example of the Y-axis nut box preferably used in the present invention.
Figure 4:
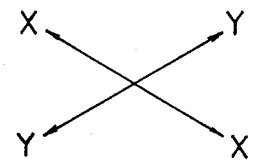

The Y-axis nut box 44 and the auxiliary bearings means 50 for effecting X-axial rectilinear motion are illustrated more specifically in FIG. 4.

Referring to FIG. 4, track-forming blocks 54 are fixed on and along both the X-axial sides, respectively, of the Y-axis nut box 44 (the sides along the arrow line X—X on FIG. 4), extending to intersect at right angles with the threaded shaft 46 that in turn extends along the arrow line Y—Y of FIG. 4. The auxiliary bearing means 50 for effecting an X-axis rectilinear motion is composed of a pair of bearing units arranged in parallel-spaced relation with each other, each unit consisting of a first track-forming block 54, a second track-forming block 56 provided on the Y-axis-movable table in facing relation with said first track-forming block 54, track grooves 55A and 55B formed sidewise on the facing first and second track-forming blocks 54 and 56, respectively, and a roller-retainer 58 inserted between said facing track grooves 55A and 55B for retaining a plurality of rollers therebetween. Rollers in the retainer 58 may be so arranged that the longitudinal axes of adjacent rollers may intersect at right angles with each other so as to form a cross-roller bearing.

Now, the present invention will be further explained referring to FIGS. 1-4.

The positioning or indexing of the tables in the X-axial direction according to the present invention is carried out firstly by driving the servo-motor 20 for driving the X-axis-movable table in the X-axial direction. The rotation movement of the servo-motor 20 is transmitted to the threaded shaft 26 (see FIG. 2) thus driving the X-axis nut 28 that is engaged with the threaded shaft 26 with rectilinear motion in the X-axis direction. Since the X-axis nut 28 is fixed to the X-axis-movable table 14, rotation movement of the servo-motor 20 is converted to X-axial rectilinear motion of the X-axis table 14 (a motion in the direction of the arrow line X—X in FIG. 2). The X-axial rectilinear motion of the X-axis-movable table 14 is transmitted to the Y-axis-movable table 16 via the bearing means 32 that connects said two tables in stationary relation in the X-axis direction but in Y-axis bearing relation. That is, when the servo-motor 20 is operated to rotate, the Y-axis-movable table 16 is also moved rectilinearly together with the X-axis-movable table 14 in the X-axial direction.

However, the X-axial rectilinear motion of the X-axis-movable table 14 and Y-axis-movable table 16 is transmitted neither to the Y-axis threaded shaft 46 nor to the Y-axis nut box 44. That is, since the Y-axis threaded shaft 46 passes through the clearance slots 42 having a horizontally elongated opening, any X-axial rectilinear motion of the X-axis-movable table 14 relative to the side walls 40 can not be transmitted to the Y-axis threaded shaft 46, as it moves through along the horizontally elongated opening, while the Y-axis-movable table 16 can freely make a relative slidable movement in the X-axial direction relative to the Y-axis nut box 44, due to the presence of the auxiliary bearing means 50 capable of effecting X-axis rectilinear motion. Accordingly, even if the X-axis-movable table 14 and the Y-axis-movable table 16 move in the X-axial direction, the Y-axis driving mechanism including a motor 24, a threaded shaft 46, and a nut box 44 etc. is not mechanically influenced by the above mentioned X-axis movement.

The positioning or indexing of the table in a Y-axial direction according to the present invention is accomplished by driving a servo motor 24 for use in Y-axis-driving (see FIG. 3). The rotation movement of the servo-motor 24 is transmitted to the threaded shaft 46 and is then converted to the Y-axial rectilinear motion (the direction of the arrow line Y—Y in FIG. 3) of the Y-axis nut 48 that forms a principal part of the Y-axis nut box 44. And the Y-axial rectilinear motion of the Y-axis nut box 44 is transmitted to the Y-axis-movable table 16 through the auxiliary bearing means 50. Thus, rotation movement of the servo-motor 24 is converted to the Y-axial rectilinear motion of the Y-axis-movable table 16. In this case, relative to the Y-axial direction movement of the Y-axis-movable table, the X-axis-movable table 14 and Y-axis-movable table 16 make a relative slidable movement due to the bearing action of the bearing means 32, therefore the Y-axial motion of the Y-axis-movable table 16 does not affect nor even interfer the X-axial positioning or indexing of the X-axis-movable table 14 relative to the bed.

As stated above, the X-axis-movable table 14 and the Y-axis-movable table 16 according to the present invention can each make a rectilinear movement without giving any mechanical interference onto various driving mechanisms incorporated into the X-axis-movable table 14, while the driving servo-motors 20 and 24 are not required to be directly attached to the tables 14 and 16, respectively, but to be directly attached to the bed 12, therefore, according to the present invention, the weight of the Y-axially-driving servo-motor is not imposed onto the X-axis-movable table 14, thereby greatly reducing not only the inertial force but also indexing error which would have taken place if the X-axis-movable table is moved.

Figure 5:
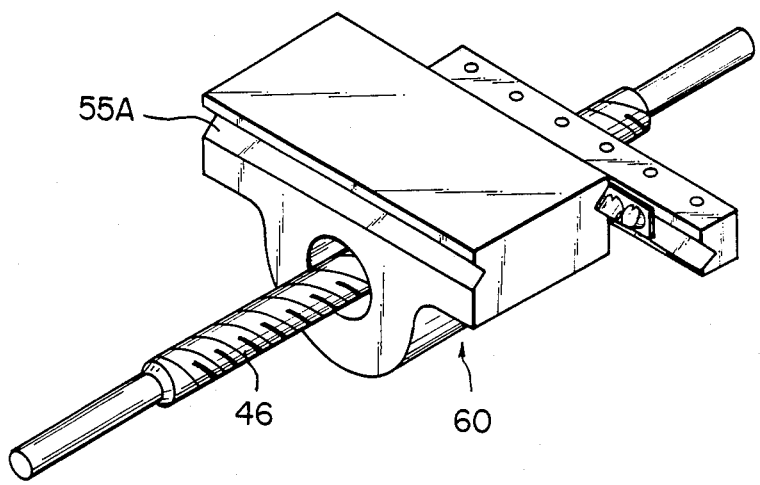
FIG. 5 is a perspective view illustrating a modified Y-axis nut box to be preferably used according to the present invention, wherein 10 . . . XY-positioning table; 12 . . . bed; 14 . . . an X-axis-movable table; 16 . . . a Y-axis-movable table; 18, 22 . . . supports for driving motors; 20, 24 . . . driving servo-motors; 26 . . . an X-axis threaded shaft; 28 . . . an X-axis nut; 30, 32 . . . bearings for effecting rectilinear motion; 38 . . . an interior space or cavity within an X-axis-movable table; 42 . . . a clearance-forming slot; 44 . . . a Y-axis nut box; 46 . . . an Y-axis threaded shaft; 48 . . . Y-axis nut; 50 . . . an auxiliary bearing; 54, 56 . . . track-forming block; 55A, 55B . . . track grooves.
Figure 5:
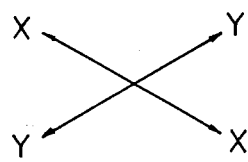

FIG. 5 illustrates a modified Y-axis nut box 60 to be also employed in the present invention. In the Y-axis nut box 60, different from the embodiment of FIG. 4, track-forming block is not provided but track grooves 55A are formed directly on the block. In this case, any position error liable to result from the attaching procedures of the track-forming block onto the nut box can be avoided.

In the illustrated embodiment, the Y-axis nut 48 and the Y-axis nut box 44 are formed into separate units but it is also possible to form the Y-axis nut and the Y-axis nut box in an integral body such as for example by forming a female screw directly in the Y-axis nut box for receiving an X-axis threaded shaft therein. The auxiliary bearing means 50 illustrated in FIGS. 4 and 5 is preferably of a type having roller-retaining means wherein the axes of adjacent rollers intersect with each other at right angles but may be of any other type of bearings without any disadvantages in use. Similarly the bearing means 30 and 32 for effecting rectilinear motion each may also be of any type of bearings as desired with the aimed effects. The driving means in the X-axial, and Y-axial directions used in the present invention may also be of any type of driving devices that are not limited only to a servo-motor.

EFFECTS OF THE INVENTION

Effects of the present invention are as follows:

(1) Since the Y-axis driving-mechanism can almost be accommodated in the interior space or cavity of the X-axis-movable table, the present XY-positioning table can be made smaller in size as compared with prior art similar bearing.

(2) Since the weight of the Y-axis driving-mechanism is not directly imposed onto the X-axis-movable table, the inertial force taking place upon the movement of the table can be greatly reduced and, accordingly, indexing or positioning operation of the XY-positioning table relative to the workpieces can be accurately accomplished.

(3) Since bearing means for effecting rectilinear motion is employed between the Y-axis driving-mechanism and the Y-axis-movable table, the load-bearing capacity of the present XY-positioning table can be greatly enhanced, while providing and ensuring positioning accuracy of the XY-positioning table relative to the workpieces.

(4) The bearing means for effecting rectilinear motion to be employed in the present invention has a greater load resisting capacity than that of radial roller bearing, hence with the use of the former bearing, accuracy of positioning and indexing performed by the present Y-axis driving-mechanism can long be kept in a stable condition.

What is claimed is:

1. An XY-positioning table comprising
a bed (12),
an X-axis-movable table (14) mounted slidably on said bed (12),
a Y-axis-movable table (16) mounted slidably on said X-axis-movable table (14),
bearing means (30, 32) for effecting rectilinear motion provided both between said bed (12) and said X-axis-movable table (14) and between said X-axis-movable table (14) and said Y-axis-movable table (16), and
X-axis driving means (20) and Y-axis driving means (24), said XY-positioning table is characterized in that
said X-axis driving means (20) and said Y-axis driving means (24) each are attached to the bed (12) through support means (18, 22);
said X-axis-movable table (14) is provided with an X-axis nut (28) engaging, in a relatively movable fashion, with a threaded shaft (26) that in turn is connected to the rotation shaft of said X-axis driving means (20);

clearance-forming slots (42) are formed in the side walls (40) of said X-axis-movable table (14), and a Y-axis nut box (44) is provided in the interior cavity or space (38) of said X-axis-movable table (14), said Y-axis nut box containing Y-axis nut (48) adapted to engage, in a relatively movable fashion, with a threaded shaft (46) that is in turn connected to the rotation shaft of Y-axis driving means (24); and auxiliary bearing means (50) for effecting X-axial rectilinear motion are provided between said Y-axis nut box (44) and said Y-axis-movable table (16).

2. The XY-positioning table as claimed in the claim 1 wherein the Y-axis nut (48) is formed integrally with the Y-axis nut box (44).

3. The XY-positioning table as claimed in the claim 1 wherein said Y-axis nut box (44) includes a track forming block (54) having track grooves (55A) formed on the sides thereof.

4. The XY-positioning table as claimed in the claim 1 wherein said Y-axis nut box (44) includes track grooves (55A) formed directly on the sides thereof.

5. In an XY-positioning table having a bed, an X-axis-movable table, a Y-axis-movable table, bearing means for permitting reciprocating motion (a) between said bed and one of said tables along a first direction conforming to one of said X-axis and said Y-axis and (b) between said tables in a second direction normal to said first direction, and driving means including a threaded shaft for each of said tables, the improvement wherein:

said driving means is carried by the bed to thereby eliminate the weight of said driving means on either one of said tables;

wherein one of said tables is provided with (a) first nut means engaging one of said threaded shafts whereby both of said tables may be reciprocated in said first direction relative to said bed and (b) second nut means engaging the other of said threaded shafts whereby one of said tables may be reciprocated in said second direction relative to the other of said tables;

wherein said one table has (a) an interior cavity for receiving said second nut means and (b) a pair of walls with horizontal slots for receiving said second shaft so as to permit relative motion between said tables in response to rotation of said second shaft; and auxiliary bearing means in contact with said second nut means and said second table.

6. A two-axes positioning table comprising
a bed;
a first table;
a second table;
first bearing means for permitting reciprocating motion between said bed and said first table along a first axis;
second bearing means for permitting reciprocating motion between said first and second tables along a second axis normal to said first axis;
first axis driving means carried by said bed; and
second axis driving means carried by said bed,
said first table having first driven means engaging said first driving means for moving both of said tables along said first axis relative to said bed in response to said driving means,
said second table having (a) second driven means interiorly of said first table responsive to said second driving means to move said second table along said second axis relative to said first table and (b) third bearing means permitting reciprocating motion along said first axis between said second table and said second driven means.

7. A method of positioning a table along first and second axes comprising the steps of:
(a) providing a bed having first and second table driving means;
(b) providing a first table slidably carried by the bed for reciprocating movement along the first axis;
(c) providing a second table slidably carried by the first table for reciprocating movement along the second axis;
(d) interconnecting the first table to the first driving means externally of the second table;
(e) interconnecting the second table to the second driving means internally of the first table;
(f) moving the first and second tables relative to the bed along the first axis in response to the first driving means; and
(g) moving the second table along the second axis relative to the bed and to the first table without thereby effecting movement of the first table in response to the second driving means.

* * * * *